United States Patent [19]
Bose

[11] 3,861,142
[45] Jan. 21, 1975

[54] ANTI-POLLUTION SYSTEMS FOR AUTOMOBILES

[76] Inventor: Ranendra K. Bose, 1554 N. Danville St., No. Arlington, Va. 22201

[22] Filed: Mar. 4, 1974

[21] Appl. No.: 447,893

Related U.S. Application Data

[63] Continuation-in-part of Ser. No. 329,884, Feb. 5, 1973, , which is a continuation-in-part of Ser. No. 35,658, May 8, 1970, abandoned.

[52] U.S. Cl. ............. 60/274, 23/288 A, 23/288 F, 55/17, 55/256, 55/260, 55/355, 55/409, 55/DIG. 30, 60/279, 60/902, 62/5, 123/119 A, 260/606, 261/124
[51] Int. Cl. ..................... F01n 3/00, B01d 45/14
[58] Field of Search ....... 55/17, 404, 405, 459, 400, 55/408, 409, 385, 255, 256, 260, 355, DIG. 30; 60/274, 279, 902; 62/5; 123/119 R, 119 A, 119 B; 260/606; 261/124, 121; 23/288 R, 288 F, 288 A

[56] References Cited
UNITED STATES PATENTS

| | | | |
|---|---|---|---|
| 603,285 | 5/1898 | Porbeck | 55/542 X |
| 2,147,670 | 2/1939 | Pratt | 123/119 A |
| 2,418,061 | 3/1947 | Weinberger | 55/452 X |
| 3,304,711 | 2/1967 | Eastman | 123/119 A X |
| 3,566,601 | 3/1971 | Fiore | 62/5 |

FOREIGN PATENTS OR APPLICATIONS

| | | | |
|---|---|---|---|
| 952,636 | 11/1956 | Germany | 62/5 |
| 324,743 | 11/1934 | Italy | 55/391 |

OTHER PUBLICATIONS

German Printed Application No. 1939554, Anmeldetag Aug. 4, 1969, (13 pespec, 3 pp. dwg.)

*Primary Examiner*—Dennis E. Talbert, Jr.

[57] ABSTRACT

The exhaust gas from an internal combustion engine is fed to a high speed turbine, serving to rotate the turbine and effecting a first separation stage by stratifying of heavier and lighter exhaust gas components which exit from the turbine in opposite directions, the heavier components having a second stratifying separation in a vortex tube to separate combustible pollutants from non-combustible components. The lighter pollutants effected in the first separation and the combustible components effected in the second separation which are also pollutants are then brought together to be mixed in a chamber and ultimately fed back to the engine carburetor. However, the so-called clean exhaust gases, namely carbon dioxide and water vapor pass out of the vortex tube to atmosphere by way of the vehicle exhaust. The mixing chamber can also function, if need be as a reservoir to collect condensate under abnormal conditions for release via a petcock. At the outlet end of the vortex tube, i.e., the exhaust end of the system, a chamber is provided for the second separation stage to collect the pollutants and, if need be, under abnormal conditions trap liquid condensate for ultimate release via a petcock. Inasmuch as the stratifying turbine in the first separation stage revolves at an extremely high speeds, a novel water cooled bearing mount is provided wherein water is tapped from the vehicle radiator and returned thereto for cooling the bearing. In addition, an air blower may be provided for furnishing air to be entrained with the mixed pollutants passing back to the vehicle carburetor. Such air blower is readily operated by a belt from the fan and water pump belting and pulley arrangement of an automobile. The system is entirely mechanical in operation and cannot in any way be harmed by the type of fuel used in the vehicle, for example leaded or non-leaded.

Further, there may be provided in the system an exhaust gas mixing chamber for the components described above having a water charge therein through which the components to be mixed bubble in the presence of zinc rods or other zinc surfaces acting as a catalyst. The arrangement effects formation of formaldehyde and nitrous acid in the water charge which can be drained out periodically. This prevents aldlehyde gases from passing to the engine which can have the effect of retarding combustion, and which might readily be formed in a mixing chamber made of, e.g., aluminum. Also, prevention of solid aldehyde compounds precludes formation of gummy substances which could cause valving in the system to stick.

20 Claims, 8 Drawing Figures

ANTI-POLLUTION SYSTEMS FOR AUTOMOBILES

The present application is a continuation in part of my previously filed application SN 329,884 filed Feb. 5, 1973, incorporated by reference herein, which in turn is a continuation in part of a previously filed patent application SN 35,658 filed May 8, 1970, now abandoned.

There is disclosed in the referenced application a system for separating combustible from non-combustible gases in the exhaust gas being emitted from an internal combustion engine which comprises an elongate conical vortex tube terminating in a small discharge outlet at one end and having a closed end wall at the large end with a central, or axial, opening therein. An inlet pipe adjacent the large end of the vortex tube admits the exhaust gas tangentially into the tube whereby a centrifugal flow is set up in the converging vortex tube so that the heavier, fully burned gases are thrown radially outward and carried out through the discharge outlet while the lighter, incompletely burned gases are squeezed back along an axial path and returned through the opening in the end wall of the tube to the air intake of the engine. A preferred modification of that invention utilizes a freely rotating turbine at the inlet end of the vortex tube which increases the efficiency of the apparatus by isolating the incoming exhaust gas mixture from the surrounding wall at entry thereby minimizing friction and turbulence as well as having other advantages in increasing the efficiency of gas separation.

The use of the invention for separating the combustible and non-combustible gases by the conversion of exhaust pressure energy to speed energy may also eliminate the necessity of having the usually inefficient exhaust muffler on present day automobiles, since the exhaust noise is directly proportional to the difference between the exhaust pressure at the outlet to the atmospheric pressure. Further, it is common in modern internal combustion engines to have dual exhaust systems conducting the exhaust gases from each side of the engine to separate exhaust gas systems, in which case the system shown herein could be duplicated for each engine side with appropriate dimensioning to accommodate the reduced exhaust gas flow.

As set forth in the referenced application, the turbine is freely rotative in as frictionless a manner as possible so that tangential entry of exhaust gas mixture will fill the spaces between blades and effect rapid spinning of the turbine. Thus, the circumferential velocity is initially as close as possible to the linear velocity of the entering gas mixture. In this manner contact between the entering mixture in passing around the interior of the turbine housing is substantially avoided due to circumferential isolation or confinement of the gas between blades and the loss due to friction and turbulence considerably minimized. As the gases expand along the tapering turbine hub the peripheral velocity increases.

Due to the tapered outer surface of the turbine hub, the exhaust gas mixture expands in volume as it moves towards the larger end of the vortex tube, thereby imparting its potential energy to speed up the turbine, and consequently the exit speed of the exhaust gases as they leave the turbine blades is increased. Also, the pressure drop at the exit of the turbine has a suction effect to permit full entrance velocity of the exhaust gas mixture to the turbine.

Importantly, frictional resistance offered by the inside walls of the housing is eliminated by the effect of the turbine and resistance of moving the exhaust gas mixture in the form of a helix as it starts to stratify is reduced. This resistance is thought due to intermediate slippage sideways of the whirling masses of gas as a part of the pressurization of the main gas stream. Still further, turbulence and agitation in the conical vortex tube which causes a good deal of frictional and other losses during separation and stratifying of layers of gases is considerably reduced and more complete separation between the lighter combustible gases and the heavier combustible gases is effected.

The turbine, having a conical or tapering construction, increases the volume of exhaust gas mixture in passing to the larger end of the vortex tube in a helical path so that a large porportion of velocity energy is converted from linear to angular rotational energy increasing the circumferential speed component and decreasing the axial speed component. Thus, a high speed spinning effect is continuously created with a minimization of frictional loss. On leaving the turbine the gas mixture is sent spinning into the vortex tube at the larger end where its circumferential speed of rotation is progressively increased towards the smaller end. Since the gas mixture already has a high circumferential speed in entering the vortex tube the increasing circumferential speed augments the efficiency of stratification by the increase in centrifugal force whereby the incombustible gases are expelled at the smaller end of the vortex tube and the combustible or lighter gases more rapidly and effectively forced to the center of the whirling stratifications to be expelled back to the engine to be mixed with the new fuel mixture.

Applicant believes that by spinning the gas mixture at high circumferential speed there is a reduction in frictional resistance against the wall of the vortex tube and thus less turbulence.

Applicant has found that the use of the turbine substantially increases the stratification effect of the vortex tube to the end that a higher quantity of combustible gases for recycling is realized.

A detailed description of the invention now follows in conjunction with the appended drawing in which.

Figure 1:
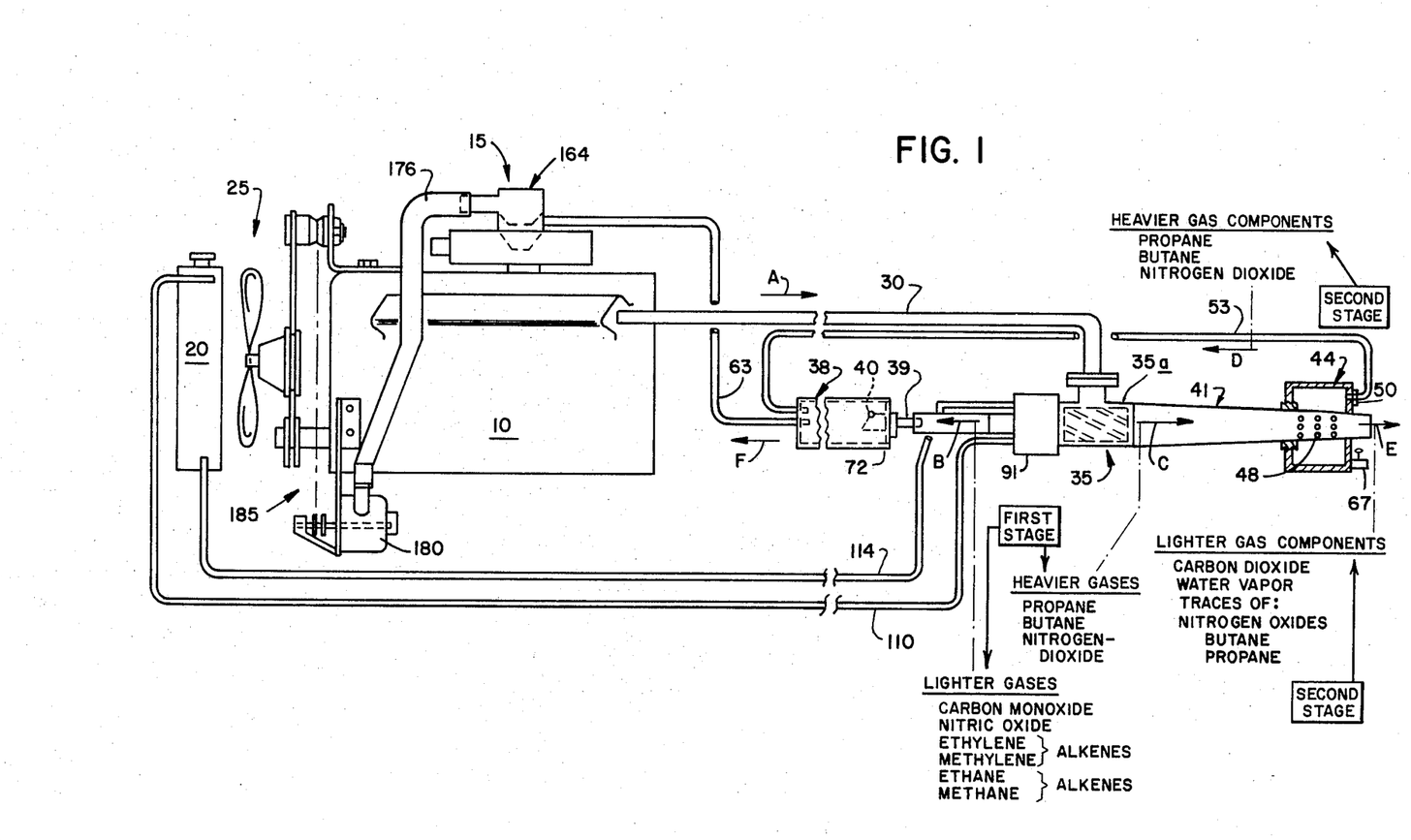
FIG. 1 is a diagramatic illustration of the overall system and essential components.

Referring to FIG. 1, the diagram depicts an automobile engine 10 of a conventional nature having a modified air filter 15 as will later appear, a radiator 20, and fan and water pump belt and pulley arrangement of conventional construction generally designated as 25.

A pipe 30 from the exhaust manifold leads substantially to the rear of the automobile to a gas rotated turbine 35 having housing 35a which is substantially as disclosed in my previously filed Patent Application, SN 329,884 filed Feb. 5, 1973. The exhaust gas is stratified as explained in the previously filed application, this being a first stage of separation in the present invention, so that the lighter combustible components, pollutants, such as carbon monoxide, ethylene, ethane, methane, methylene, and nitric oxide are separated radially inwardly of the turbine and leave therefrom in the direction of the arrow B to a mixing chamber 38 via pipe 39. A check valve 40 is provided to prevent back suction from chamber 38 to the turbine. For ease of manufacture the chamber and valve constructions may be cylindrical.

The heavier pollutants portion, such components as propane, butane and nitrogen dioxide leave the vortex tube and turbine in the direction of the arrow C. Such heavier components go through a vortex tube 41 for stratifying separation and into a second stage separation chamber 44 via small bores 48 at the end of the vortex tube which end passes through chamber 44. A check valve 50 prevents back suction from pollutant exit tube 53 to the chamber. The heavier portion components of the second separating state, e.g., propane, butane, and nitrogen dioxide pass in the direction of arrows D through tube 53 to mixing chamber 38. The lighter portion components, carbon dioxide and water vapor, and traces of non-pollutants, such as nitrogen oxides, butane and propane, exit to atmosphere in the direction of arrow E through the open end of the vortex tube.

In actual composition, the portions from the first separation stage are primarily combustible, while the portions from the second separation stage are primarily combustible in return to chamber 38 and primarily non-combustible in exit to atmosphere. Of course, the vortex tube 41 is a part of both separation stages as will be understood from the description.

In the mixing chamber 38 the light and heavy pollutants are mixed and pass via tubing 63 in the direction of the arrow F tp the air filter 15 for mixing with incoming fuel to the engine to be burned as part of the fuel mixture.

It will be noted that the second separating chamber 44 has a petcock 67 for intermittent release of condensate liquids, e.g., nitric acid which may be formed from nitrogen dioxide gas mixing with water vapor. The mixing chamber 39 has a petcock 72 for release of liquids which may be formed therein, such as nitrous acid caused by mixing of nitric oxide and condensing water vapor. However, it is expected that in normal operation of the system no condensates of any significance will occur and testing of a proto-type system on a conventional automobile engine bears this out. The factor is the speed of the turbine; it has been observed that when operating at proper speed no condensates have been found to collect which require repetitive draining but it is conceivable that considering all the extreme conditions to which vehicles are subjected that condensates could accumulate and hence the precaution of providing petcocks.

While it may appear anomalous that gases leave the vortex tube in opposite directions, the egress in the direction of arrow B is of essentially lighter gases being squeezed out at the core region by the phenomonon of whirling a gas mixture to effect stratification, while the exhaust in the direction of arrow E are actually gases of the initial heavier outer layer but relatively lighter than the other gases that emerge via the perforate area at the smaller end of the tube. These relatively lighter gases being initially part of the heavy layer have a high momentum axially and therefor can flow in the heavy gas direction to emerge as exhaust.

In view of the very high rotative speeds of the turbine 35, it has been found after considerable experimentation and development that the bearings for the turbine rotor 80 are subjected to excessive wear due to frictional heat generated. Accordingly, referring now to FIG. 2 in particular, it will be noted that hollow turbine rotor 50 having blades 80a is integrally supported at its ends on a hollow shaft 83 being welded thereto at said ends. The hollow shaft 83 serves as a passageway for the lighter pollutants passing therefrom in the direction of the arrow B. Shaft 83 has a unique support; cantilevered on a pair of roller bearings such as 87 carried in a housing 91 and terminating in the hub of the housing.

Figure 2:
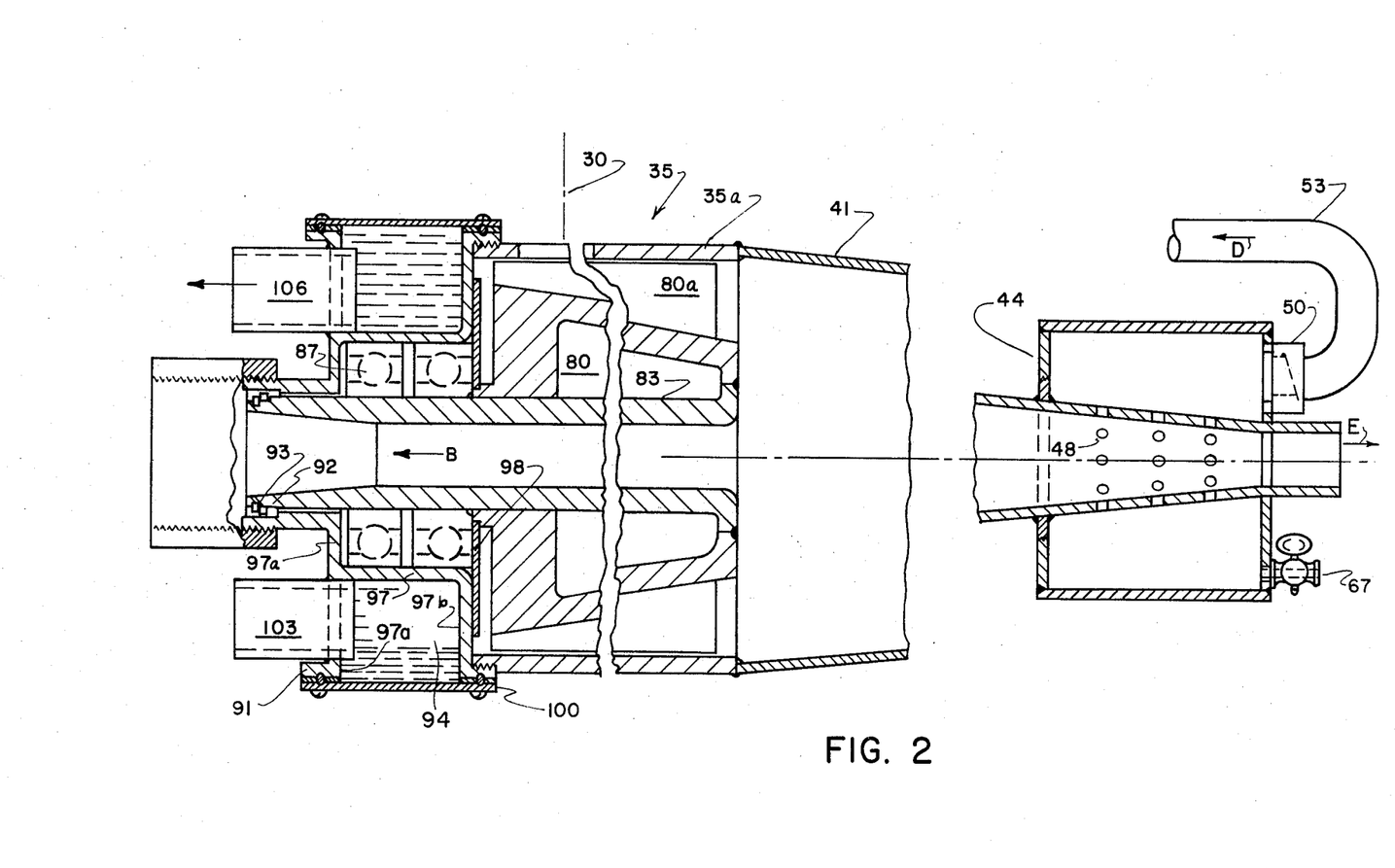
FIG. 2 is a cross sectional elevation showing details of the turbine and bearing mount as well as the exhaust end components.

A seal ring 92 and lock ring 93 are provided at the end of shaft 83 which shaft has an internal diameter of about 1 inch.

Housing 91 is constructed as an annular channel 94 having the annular collar 97 and radial falnges or walls 97a and 97b. Collar 97 is provided with a heat barrier such as asbestos disc 98. Encompassing the housing, and thus closing and sealing the annular channel is a collar 100 fastened as by screws and suitably gasketed so that the annular channel and collar form a cooling chamber to hold cooling water. Thus, heat generated in the bearings is transmitted through the collar 97 and the radial walls to the cooling water.

Housing 91 has an inlet tube 103 and an outlet tube 106 welded to wall 97A to provide ports connected by respective tubes 110 and 114 (FIG. 1) to the radiator 20 for circulation of water therefrom to effect cooling of bearings 87.

Housing 91 may also be aircooled by the provision of of fins on its periphery.

Connecting to the turbine housing 35a is the vortex tube 41 of about 18 inches in length having its end sealed within the chamber 44, 3½ inches at its larger end and 1 inch at its smaller end, internal diameter. It is provided with a perforate or apertured area comprising bores 48 in three peripheral arrays as shown. The bores are about 5/64 of an inch in diameter in an area about 2 inches long axially, approximately 24 bores eight to an array, the first circle of bores being about 1 inch from the smaller end of the tube. Such perforating has been found to permit egress of burnable gases primarily propane and butane to go back to tube 53 (FIG. 1) while permitting exhaust to atmosphere of the non-burnable or clean exhaust gases, primarily carbon dioxide and water vapor with minimal amounts of nitrogen oxides.

Nitrogen oxides have been calculated from tests of a prototype of the invention at 3.75 grams per mile, with 3.41 grams per mile of hydrocarbons, and 14.4 grams per mile of carbon monoxide. This compares closely to the 1975 relaxed standards of 3.0 of nitrogen oxides, and 1.5 for hydrocarbons and 15.0 for carbon monoxide with a fuel economy achieved by the invention of a calculated 7.4 percent.

The prototype turbine and vortex tube were as described in the application incorporated by reference therein, S.N. 329,884, except for the changes described in this application.

Testing for the above figures was made by the Environmental Protection Agency at its Ann Arbor, Michigan facility. Fuel economy was computed by the carbon balance method by the same laboratory. The prototype was installed on a Ford Fairlane 1965, six cylinder engine, 200 c.i.d. in May, 1973. However, by actual fuel economy measurement in a federally approved laboratory, Olson Laboratories, Inc., Detroit, Michigan, fuel economy was found to be 12.5 per cent.

Figure 3:
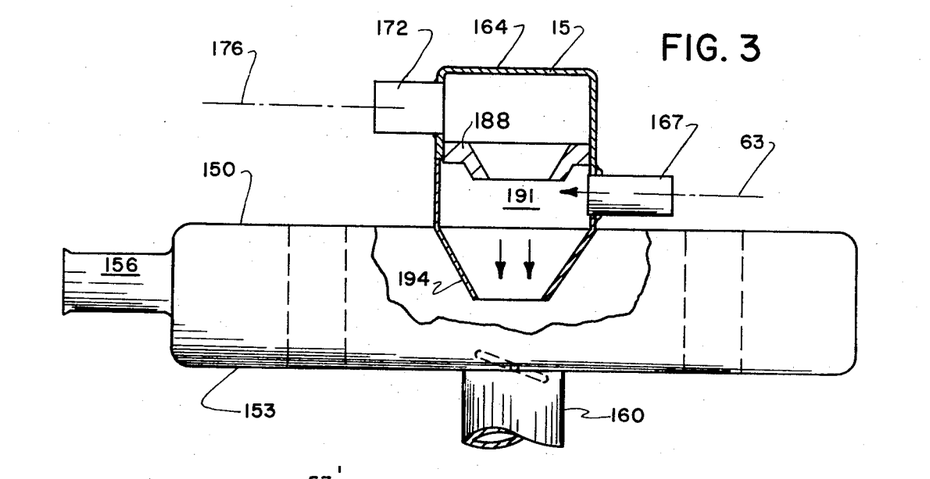
FIG. 3 is an elevational cross section showing details of the inflow to the air filter of reentrant pollutants and auxiliary air.

Referring now to FIG. 3, the cross-sectional elevation of air filter 15 of generally conventional construction is illustrated having the usual bonnet or hood 153 and conventional air inlet 156, the hood being mounted on the carburetor (not shown) air intake pipe 160. Mounted on the hood is a fixture comprising a tubular housing 164 having a side port with a fitting 167 which will be understood to connect to the tube 63 of FIG. 1 for ingress of burnable pollutants. The fixture is also provided with a higher port having a fitting 172 for connection to an air tube 176 (FIG. 1) fed with air under suitable pressure of 2–3 pounds per square inch from a blower 180 which may be powered in any suitable manner as by a pulley and belting generally designated as 185, a takeoff from the engine crankshaft directly or indirectly through the pulley and belt system at the front of the engine. In the actual prototype, a pulley mounted on a braket, in turn mounted on the engine block, and driven from the crankshaft was found suitable, all as diagramatically illustrated in FIG. 1. Of course, any mode of powering the air blower may be used, including engine exhaust or an electric motor.

In any event, auxiliary air from blower 180 flows downwardly through a velocity increasing nozzle 188 (FIG. 3) to mix with reentrant gases therebelow in the region 191 and the mixture then going to the nozzle 194 and then to the interior of the air filter for further mixture with the main incoming air via port 156.

Figure 4:
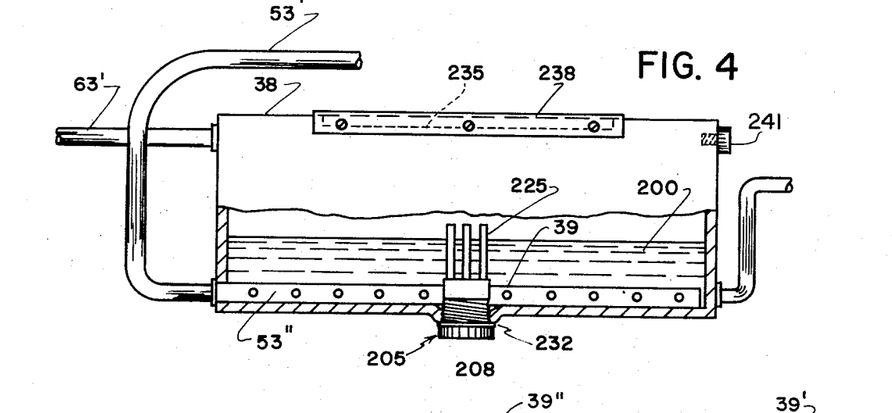
FIG. 4 shows a modified form of mixing chamber in elevation, partially sectioned.
Figure 5:
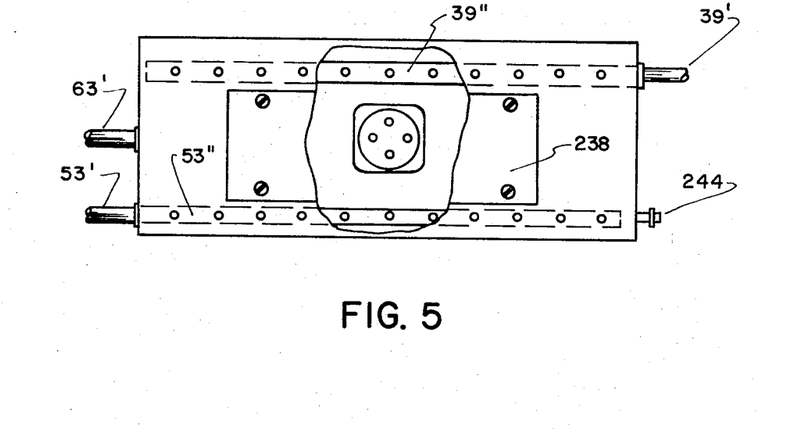
FIG. 5 shows an external plan view of the modified mixing chamber, partially broken to reveal interior details.
Figure 6:
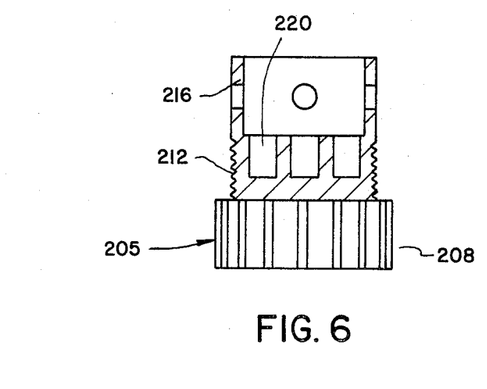
FIG. 6 shows the details of a component of FIG. 4.

Referring to FIGS. 4, 5, and 6 a modified mixing chamber 38' is disclosed having the inlet tube 39' for entry of gases from the first stage separation device 35 of FIG. 1. Similarly, the pipe 53' bearing combustible gases from the second stage separation device 44 of FIG. 1 while pipe 63' will be understood to go to the engine with a mixture of combustible gases.

Mixing chamber 38' has a perforate closed end tube 39'' extending generally along the bottom of the tank and another perforate closed end tube 53'' similarly so extending, which tubes connect to respective pipes 39' and 53'. A charge of water 200 is contained in the mixing chamber and gases from tubes 39'' and 53'' bubble up through the water to reach the exit pipe 63' for egress to the engine as noted in FIG. 1. The effect of bubbling the combustible gases from the separation stages through the water is to prevent aldehyde gases from reaching the engine cylinders, by effecting a formation of formaldehyde. The chemical reactions taking place due to disintegration of gasoline in the course of combustion in the engine produce alkanes, alkenes and ozone. These combine in various ways to form aldehydes which cannot only retard combustion but also form gummy substances to cause the check valve 40 to stick thereby blocking the operation of the system. However, by bubbling the combustible exhaust gases through water in the presence of a catalyst the interaction is such that the harmful aldehydes are primarily converted to formaldehyde which is periodically discharged from the mixing chamber. The catalyst used may consist of zinc rods in a holder 205 secured at the bottom of the mixing chamber. For example, a plastic member which may be an integrally molded piece comprises a knurled knob 208 having a threaded body section 212 from which extends a cup 216 preferably perforated as shown in FIG. 6.

Section 212 is provided with sockets such as 220 into which can be screwed or force fitted spaced zinc rods, such as 225, which extend through the water charge 200.

The bottom of the mixing chamber 38' has a square flat 228 pressed therein in order to sealingly seat knob 208 with an intermediate gasket 232. The mixing chamber is provided with a sufficiently large opening 235 across the top closed by an arcuate cover 238 which may be fastened by screws in order to press out the flat for the zinc rod holder 205 or clean the chamber, etc. Preferably the chamber is cylindrical, but of course can be of any desired shape.

A water charge may be introduced by removal of the screw plug 241 and from time to time the water charge, with formaldehyde and other chemical materials which may form, can be released by the petcock 244.

The alkanes occur from ethane and methane and the alkenes occur from ethylene and methylene in the combustion process. The ozone is formed from oxygen in the cylinders when high voltage sparks occurs. Nitrogen oxides acts as a catalyst in the formation of ozone and hydrocarbons. The presence of nitrogen oxides is thought to be to some extent beneficial to oxidize hydrocarbons. A reference text on this subject matter is *Chemistry of the Carbony Group* by Saul Patai; published 1966, page 91, Interscience Publishers.

Figure 7:
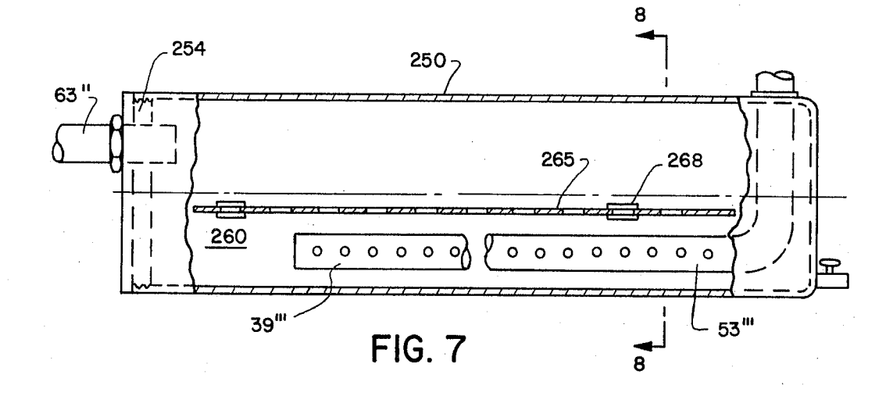
FIG. 7 is an elevation in cross section of a further modified mixing chamber.
Figure 8:
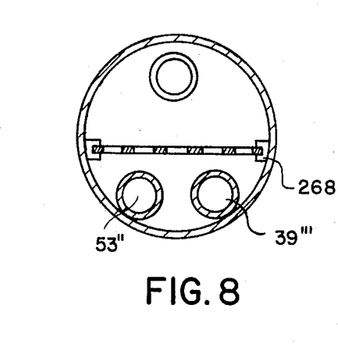
FIG. 8 shows an end view in section on line 8—8 of FIG. 7.

Referring to FIGS. 7 and 8, a further modified mixing chamber 250 is illustrated, closed at one end by a threaded plug 254 through which connection is made with pipe 63'' leading back to the engine carburetor. The perforate tubes 39''' and 53''', closed end tubes as shown, connect respectively to the turbine and vortex tube, similar to the arrangement of FIGS. 1 and 5.

The mixing chamber 250 has a water charge 260 in which are immersed the perforate tubes and the construction is substantially the same as shown in FIGS. 4 and 5 wherein gases will bubble up through the water. This achieves the same effect as previously described. In this instance, however, the catalyst is a perforate zinc plate 265 above the tubes and below the water surface, being slideably secured in side brackets 268 integrally fastened to the interior of the chamber wall. The chamber 250 and brackets 268 can be an integral aluminum casting, the sliding fit for plate 265 being designed with sufficient friction to hold the plate in place.

It can be calculated that an automobile engine having 400 hp., 425 cu. in. displacement, and operating at 4,000 rpm. will exhaust gases through a dual exhaust manifold at approximately 250 ft/sec., and that if these gases are circulated through the turbine and vortex tube having proportions as set forth above, the rotational velocity of the exit gases will be approximately 700–740 miles per hour. This is in the range of the speed of sound in air and believed to be advantageous in the operation of the invention. Thus, the waste pressure energy is converted into rotational speed energy in the operation of the invention to achieve ultimate rotational exhaust gas speeds in the speed of sound range which, of course, is a variable depending on various factors. Accordingly, no fixed rotational exhaust speed at the smaller end of the vortex tube can be given save to say it approximates sound speed. The axial egress speed would, of course, be less.

The car described previously as being used for test had tangential entry of exhaust gas mixture to the turbine at a calculated 175–200 m.p.h. The gas mixture speed in a rotational direction flowing from the ends of the turbine blades to the larger end of the vortex tube was a calculated 250 m.p.h. The gas mixture speed at the smaller end of the vortex tube was calculated at 700–740 m.p.h. in a rotational direction, giving a considerably augmented centrifugal effect for separation in the perforate area of the vortex. These figures are calculated for a test speed of 3,500 r.p.m. of the crankshaft, equivalent to 60 m.p.h. car speed.

It is contemplated that a turbine having 24 blades would be suitable for either a six or eight cylinder car and would obtain a higher rotative gas mixture speed. Thus, a 24 blade turbine would be a multiple of the number of cylinders of a six or eight cylinder car, believed preferable for optimum operation.

For convenience of correlating the effects of the separation steps, in terms of arrow directions as found in FIG. 1:

| Arrow | Gases |
| --- | --- |
| A: | Exhaust from engine manifold, gas mixture of combustible and non-combustible gases, tangential feed to rotate turbine. |
| B: | Lighter inner core of gas mixture comprising primarily combustible gases such as carbon monoxide, nitric oxide, ethylene, methylene, ethane, methane. |
| C: | Heavier of the heavy outer layer of gas mixture of combustible and non-combustible gases such as propane, butane, nitrogen dioxide and the lighter of the heavier gases such as carbon dioxide, water vapor with some traces of nitrogen oxide, butane propane. |
| D: | Substantially a mixture of the heavier of the heavy gases, as above. |
| E: | Substantially a mixture of the lighter of the heavier gases, as above. |

The arrows B and C denote the separation effect of the first stage while the arrows C, D and E denote the separation effect of the second stage. The operation of the vortex tube must, of course, be considered as active in both stages.

What is claimed is:

1. A method of separating components of the exhaust gas mixture of an internal combustion engine for subsequent burning of pollutant components which comprises:
   effecting a first separation of the exhaust gas mixture into heavier and lighter components wherein the lighter components are primarily combustible pollutants;
   effecting a second separation in which said heavier components are separated into a first portion comprising substantially carbon dioxide and water vapor for egress to atmosphere and a second portion comprised substantially of combustible pollutants for subsequent combustion in said engine; and mixing said second portion with the lighter components effected in the first separation to effect a combustible mixture for re-entry to said engine.

2. An apparatus for separation of exhaust gas components of an internal combustion engine to reduce atmospheric pollution, comprising:
   a first exhaust gas separating device and means for bringing exhaust gas thereto from an engine whereby exhaust gas is separated into its lighter and primarily combustible components substantially separated from its heavier and primarily non-combustible components;
   a second separating device and means for conducting said heavier components thereto from said first separating device;
   a mixing chamber and means whereby said lighter components are fed thereto;
   said second separating device communicating with the atmosphere and having means to substantially separate combustible gases of said heavier components from non-combustible gases;
   means to feed said combustible gases to said mixing chamber to be mixed with said lighter components; and
   means to feed the mixture to said engine while said non-combustible gases egress to the atmosphere from second separating device.

3. An apparatus as set forth in claim 2, wherein said first gas separating device comprises an exhaust gas driven turbine and a conical vortex tube open at both ends and connected thereto at its larger end so as to receive rotating gas discharge therefrom for separation therein into an inner gas core of said primarily combustible lighter gases moving axially toward said turbine and an outer layer of said heavier gases moving axially in the opposite direction for separation in said second separating device into said primarily combustible and non-combustible gases, said means for conducting said lighter gases of said inner core from said conical vortex tube to said mixing chamber comprising a hollow shaft for support of said turbine communicating with said vortex tube at the inner core region thereof.

4. An apparatus as set forth in claim 2, wherein said first gas separating device comprises an exhaust gas driven turbine and a conical vortex tube open at both ends and connected thereto at its larger end so as to receive rotating gas discharge therefrom for separation therein into an inner gas core of said primarily combustible lighter gases moving axially toward said turbine and an outer layer of said heavier gases moving axially in the opposite direction for separation in said second seaparating device into said primarily combustible and non-combustible gases.

5. An apparatus as set forth in claim 4, said second separating device comprising a perforate area in said vortex tube and a gas collector chamber surrounding said perforate area whereby the outer layer of heavier gases passing through said vortex tube exit therefrom through said perforate area into said collector chamber for return to said mixing chamber while the relatively lighter inner core of primarily non-combustible gases of said heavier outer layer egress to atmosphere at the smaller open end of said vortex tube.

6. An apparatus as set forth in claim 4, including an internal combustion engine in combination therewith and having a cooling radiator, a bearing support means for said turbine and means for conducting cooling fluid from said radiator to said rotative support means, with return to said radiator, for cooling said bearing support means.

7. An apparatus as set forth in claim 4, including means for mixing return gases from said mixing chamber with fresh fuel vapor for feed to said engine, said means comprising a blower for auxiliary air to be entrained in returning combustible gas mixture.

8. An apparatus for separation of exhaust gas components of an internal combustion engine to reduce atmospheric pollution, comprising:
a first exhaust gas separating stage and means for bringing exhaust gas thereto from an engine whereby exhaust gas is separated into its lighter and primarily combustible components substantially separated from its heavier and primarily non-combustible components;
a second separating stage and means for conducting said heavier components thereto from said first separating stage;
a mixing chamber and means whereby said lighter components are fed thereto from said first separating stage;
said second separating stage having means communicating with the atmosphere and having means to substantially separate combustible gases of said heavier components from non-combustible gases;
means to feed said latter combustible gases of said second separating stage to said mixing chamber to be mixed with said lighter components of said first separating stage; and
means to feed the mixture to said engine while said non-combustible gases of said second separating stage egress to the atmosphere.

9. An apparatus as set forth in claim 8, wherein said gas separating stages comprise an exhaust gas driven turbine and a conical vortex tube connected thereto at its larger end so as to receive rotating gas discharge therefrom for initial separation by axial movement in opposite directions therein of an inner gas core of said primarily combustible lighter gases and an outer layer of said heavier gases for subsequent separation into said primarily combustible and non-combustible gases.

10. An apparatus as set forth in claim 8, said mixing chamber having a water charge therein and means for bubbling the return combustible gases thereto through said water to remove aldehyde components in order to preclude aldehyde components from entering said engine, including a catalyst in said mixing chamber to augment reaction of said combustible gases with said water.

11. An apparatus as set forth in claim 8, wherein said gas separating stages comprise an exhaust gas driven turbine and a vortex tube connected to said turbine to receive rotating gas discharge therefrom for separation into an inner gas core of said primarily combustible lighter gases and an outer layer of said heavier gases for subsequent separation into said primarily combustible and non-combustible gases, said means for conducting said lighter gases of said inner core from said vortex tube to said mixing chamber comprising a hollow shaft for said turbine communicating with said vortex tube at the inner core region; including mounting means for said turbine comprising a bearing device encompassing said hollow shaft, support means for said bearing device comprising a housing having a hollow hub in which said bearing device is carried, and said housing having an annular cooling chamber surrounding said hub for cooling said bearing device and means for conducting a cooling medium through said cooling chamber.

12. In an apparatus as set forth in claim 11, including check valves disposed to prevent return of gases from said mixing chamber to said first and second separating stages.

13. In an apparatus as set forth in claim 11, including feedlines from said separating stages to said mixing chamber having portions at higher levels than the level of water charge in said mixing chamber to effect water traps preventing reverse flow of gases from said mixing chamber.

14. An apparatus for separation of a mixture of exhaust gases of an internal combustion engine for burning combustible portions thereof to reduce atmospheric pollution comprising:
a rotational device and means feeding an exhaust gas mixture thereto to be rotated thereby to effect a rotational directional speed of gas mixture passing therethrough greater than the speed of exhaust gas mixture fed to said device;
a vortex tube connected to said rotational device for receiving rotating exhaust gases therefrom to be stratified therein into a heavier outer layer of mixed combustible and non-combustible gases and a lighter inner core of primarily combustible gases;
means for feeding said inner core gases to an internal combustion engine to be burned therein;
means for separating said heavier outer layer into substantially combustible gases and substantially non-combustible gases comprising an apertured area of said vortex tube through which area said latter combustible gases leave said vortex tube;
means for feeding said latter combustible gases to said internal combustion engine to be burned therein; and
means for exhausting said latter non-combustible gases from said vortex tube.

15. An apparatus as set forth in claim 14, wherein the means for feeding said inner core combustible gases and said combustible gases from said outer layer of gases comprises a common mixing chamber in which all said combustible gases are mixed and said means for feeding said inner core gases to said internal combustion engine further comprising a feed means to said engine from said mixing chamber for the mixture of said combustible gases.

16. An apparatus as set forth in claim 15, said vortex tube being tapered to increase the rotational speed of the gases therein; the larger end thereof being connected to said rotational device and the smaller end being open for exhausting said non-combustible gases; said apertured area being adjacent said smaller open end.

17. An apparatus as set forth in claim 15, including an internal combustion engine in combination with said apparatus and said rotational device being a turbine connected thereto for tangential exhaust gas feed thereto and axial flow therefrom to said vortex tube.

18. An apparatus as set forth in claim 15, including an internal combustion engine in combination with said apparatus and said rotational device connected thereto to be driven by the exhaust gas mixture thereof.

19. An apparatus as set forth in claim 16, including a water charge in said mixing chamber and means for passing said combustible gases through said water charge to preclude passing of aldehydes from said mixing chamber.

20. An apparatus as set forth in claim 8, said mixing chamber having a water charge therein and means for bubbling the return cumbustible gases thereto through said water to remove aldehyde components in order to preclude aldehyde components from entering said engine, including a catalyst in said mixing chamber to augment reaction of said combustible gases with said water; said catalyst comprising a perforate plate of material having catalytic properties disposed in said mixing chamber in said water charge and through which said return combustible gases pass.

* * * * *